United States Patent [19]

Sublet

[11] Patent Number: 5,014,459
[45] Date of Patent: May 14, 1991

[54] ADJUSTABLE-DEPTH BAIT SLIDER

[76] Inventor: Warner G. Sublet, 293 Aker Dr., Myrtle Creek, Oreg. 97457

[21] Appl. No.: 470,097

[22] Filed: Jan. 25, 1990

[51] Int. Cl.$^5$ ............................................. A01K 91/04
[52] U.S. Cl. ................................... 43/44.85; 43/44.84; 43/43.1; 43/42.74; 24/129 R
[58] Field of Search .................... 24/129 D, 129 R; 43/43.1, 44.82, 44.84, 44.85, 42.74, 44.87, 44.83, 43.15

[56] References Cited

U.S. PATENT DOCUMENTS

| 473,503 | 4/1892 | Herring | 43/44.85 |
|---|---|---|---|
| 1,153,053 | 9/1915 | Forster | 43/44.85 |
| 1,670,185 | 5/1928 | Bond | 43/44.84 |
| 1,970,752 | 8/1934 | Hughes | 24/129 R |
| 2,382,677 | 8/1945 | Thomas | 43/44.85 |
| 2,482,901 | 9/1949 | Cranfrone | 43/44.85 |
| 2,727,331 | 12/1955 | Flinberg | 43/44.84 |
| 2,893,159 | 7/1959 | Baird | 43/44.85 |
| 2,908,989 | 10/1959 | Povinelli | 43/42.74 |
| 2,929,168 | 3/1960 | Furuto | 43/44.84 |
| 3,140,520 | 7/1964 | Marino | 43/44.85 |
| 3,160,979 | 12/1964 | Bissell | 43/43.1 |
| 3,535,815 | 10/1970 | Lowndes | 43/44.85 |
| 4,060,927 | 12/1977 | Haun | 43/43.1 |
| 4,524,539 | 6/1985 | Morris | 43/44.87 |

FOREIGN PATENT DOCUMENTS 634286 3/1950 United Kingdom ............... 43/44.84

Primary Examiner—Kurt Rowan
Attorney, Agent, or Firm—Edward B. Anderson

[57] ABSTRACT

A bait line is secured to a main line above a sinker attached to the end of a main line during fishing by a rod having a cylindrical outer surface and opposite tapered ends. A main line bore extends from each rod end through the rod and out through a bore side opening in the cylindrical outer surface opposite from the other bore side opening. Each main line bore allows substantially unrestrained passage of the main line. Each bore side opening is closer to the rod end through which the associated bore extends than to the other rod end so that when the main line is placed through the bores, it extends between the two bore side openings in the same general direction as the main line travels through the bores. the main line wraps around the cylindrical outer surface of the rod. An auxiliary channel extends transversely through an intermediate portion of the rod and has oppositely disposed channel side openings positioned closer to one rod end than to the other rod end.

7 Claims, 2 Drawing Sheets

ADJUSTABLE-DEPTH BAIT SLIDER

FIELD OF THE INVENTION

This invention relates to fishing, and particularly to devices for positioning an auxiliary element, such as a fish hook, at a predetermined position along a main line.

BACKGROUND AND SUMMARY OF THE INVENTION

During fishing, either trolling or still fishing, it is a common desire among anglers to position fish bait at a particular depth at which it is believed or known that the fish will be swimming. Floats have historically been used in still fishing to hold the bait at a particular depth below the water's surface. However, if the fish swim at a particular level above the bottom of the body of water, the float will not do a satisfactory job if the bottom is not even.

An alternative to the float has been to tie a bait leader and hook at a particular distance above a weight or sinker. Devices are also sold that serve the same purpose. One such device is referred to in the *Cabela's* 1989 *Fishing and Marine Accessories* catalogue, p. 46 as "The Bear Paw Line Leader Connection". This device attaches the two lines together using a plug that is inserted into a tapered sleeve to crimp the main fishing line. These approaches put the bait at the desired level above the bottom, but also creates a potential hindrance, if the bottom has uneven rocks or other debris that might snag the sinker, thereby preventing the retrieval of the line, whether or not a fish has taken the bait. The sinker line and the leader can also become tangled during play of a fish.

Various devices have been developed to support the bait above the bottom of the body of water or below the surface of the water. These devices include a freely sliding sinker positioned between a float and the fishing pole, as described in U.S. Pat. No. 2,572,790 issued to West for "Fishing Float". A device that holds a supply of sinker line to an intermediate point between the pole and bait on a main fishing line is disclosed in U.S. Pat. No. 2,596,269 issued to Metzger for "Trolling Device". This device allows the length of line to the sinker to be adjusted without changing the sinker line.

Coughlin, in U.S. Pat. No. 2,726,476 entitled "Fish Tackle Floats", describes an elaborate float that allows line to slip past the float, such as when a sinker is dropping to the bottom of a body of water after a cast, before the sinker engages the line to prevent further movement of the line relative to the float.

In U.S. Pat. No. 3,114,984 entitled "Traveler for Fishing Lines", Atton discloses the use of discs removably attachable to a line to act as stops for a float slidably attached to the line. This allows the line to be cast and puts the bait at a desired level below the float stop.

A novel approach to this situation is provided by Jorgensen in U.S. Pat. No. 3,897,649. The "Fishing Device" described in this patent includes a long tube with a weight attached to the near end. The fishing line passes through the tube to a float attached to the distal end of the line. The line and float hold the tube vertically. The fish leader and bait are attached to the tube at the desired level above the bottom.

As can be seen, such devices are complex and require extensive devices or weights to be attached to the lines. Many, such as those with floats, prevent a direct line of tension between the fishing pole and bait, as is important in order to "set" the hook. In those systems that have separate bait and sinker lines, both lines are extended, even during retrieval of a fish, thereby increasing likelihood of snagging the sinker during retrieval.

The present invention generally overcomes these limitations of fishing devices that hold a fish hook at a selected distance from the end of the fishing line. Further, it does so with a device that is light, unlikely to snag, and which is easily adjustable along the fish line. The invention further provides the capability of retracting the sinker line relative to the bait line, so that the sinker does not hang free to drag on the bottom of the body of water. This results in a direct line of pull between the pole and the sinker and bait.

These features are generally provided by a device for positioning an auxiliary element, such as a leader, along a main line. First and second spaced-apart line restraints restrain lateral movement of respective first and second portions of the main line while allowing substantially free movement along a path defined by the main line. A means is provided for maintaining the first and second line restraints at spaced locations. A surface element coupled to and positioned between the first and second restraints has a surface along which the main line extends when restrained by the first and second restraints, such that as greater tension is applied to the main line, greater force is required to move the main line along the line path over the surface. Finally, a means, coupled to the surface element, secures the auxiliary element to the surface element for movement with the surface element when the surface element is moved relative to the main line.

These features exist in the preferred embodiment of the present invention which secures a bait line to a main line above a sinker attached to the end of a main line during fishing. This embodiment includes a body or rod having a cylindrical outer surface and opposite tapered ends. A main line bore extends from each rod end through the rod and out through a bore side opening in the cylindrical outer surface opposite from the other bore side opening. Each main line bore allows substantially unrestrained passage of the main line. Each bore side opening is closer to the rod end through which the associated bore extends than to the other rod end so that when the main line is placed through the bores, it extends between the two bore side openings in the same general direction as the main line travels through the bores. The main line wraps around the cylindrical outer surface of the rod. An auxiliary channel extends transversely through an intermediate portion of the rod and has oppositely disposed channel side openings positioned closer to one rod end than to the other rod end.

It can be seen that such a device can be made small and lightweight, is easy to manufacture, does not pinch the main fishing line, and yet is easily moved along the fishing line when there is little tension on the line. These and other advantages and features of the invention are apparent from the following detailed description of the preferred embodiment and the associated drawings.

DETAILED DESCRIPTION OF THE PREFERRED EMBODIMENT

Figure 1:
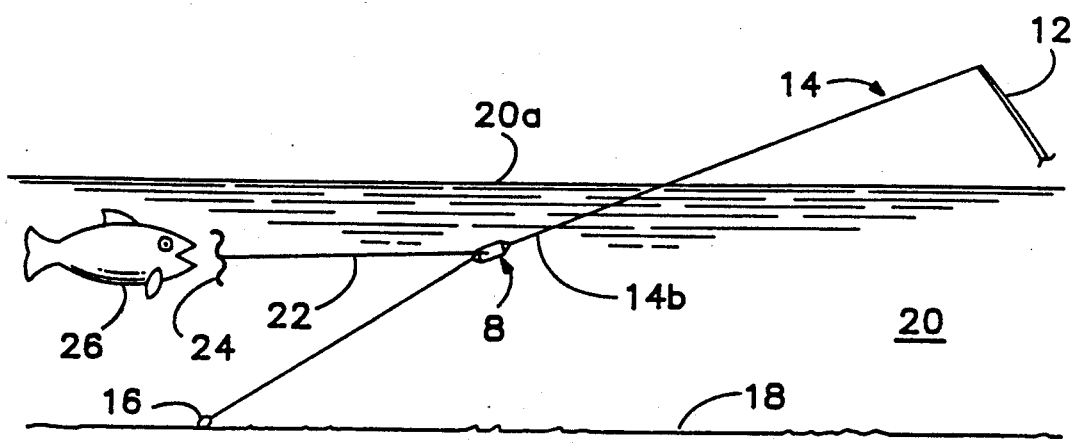
FIG. 1 is a sketch showing use of the preferred embodiment of the invention during fishing.
Figure 2:
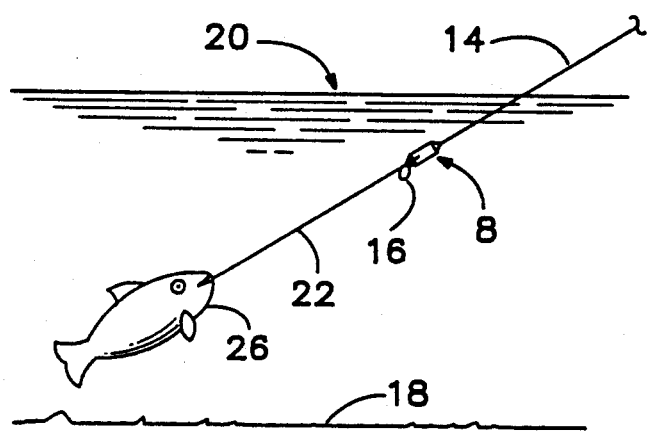
FIG. 2 is a sketch similar to FIG. 1 showing operation of the embodiment of FIG. 1 during retrieving of a hooked fish.

Referring initially to FIGS. 1 and 2, a device 8 having a body 10 and made according to the present invention is shown in use during fishing. A pole 12 and associated reel (not shown) are controlled by a person (an angler). A main line 14 is reeled out from the pole to a weight or sinker 16 attached to the distal end of the line. The sinker, by its weight, sinks to the bottom 18 of a body 20 of water having a surface 20a.

A leader 22 is attached to line 14 by attachment to device 8. Leader 22 supports a hook holding bait 24 intended to attract a fish 26. When fish 26 takes the bait, the main line is pulled to set the hook. Since leader 22 is attached to the main line via device 8, the main line is reeled in to reel in the fish. However, when the force of resistance applied by the fish is put on device 8, particularly when the main line above device 8 and leader are pulled into alignment, device 8 slides down the main line to the sinker, as shown in FIG. 2.

Since the main line is held in tension by the weight of the sinker, traction is not lost between the pole and the fish, thereby maintaining the hook in the fish during movement of the sinker up to device 8, as the main line is reeled in. When the sinker reaches device 8, all of the force applied to the main line is applied via leader 22 to fish 26. The fish is then played and reeled in.

The structure of device 8 is more clearly illustrated in FIGS. 3–6. Body 10 of device 8 is preferably formed of a clear or colored extruded 5/16 inch diameter plastic rod extending along a longitudinal axis 28. The body is preferably 1½ inches in length with a 45° taper on each end 10a and 10b. Two 1/16 inch bores 10c and 10d extend from end openings 10e and 10f at preferably 35° angles to side openings 10g and 10h. The side openings are on opposite sides of body 10 in the intermediate section of the body having a cylindrical surface 10i. As can be seen, the side openings of bores 10c and 10d are less than half the length of the body from corresponding end openings 10e and 10f, respectively.

Finally, a transverse channel 10j passes through the rod preferably about ½ inch from the tip of end 10a. Channel 10j is about ⅛ inch in diameter. All holes are counter sunk to prevent line wear or abrasion.

Figure 3:
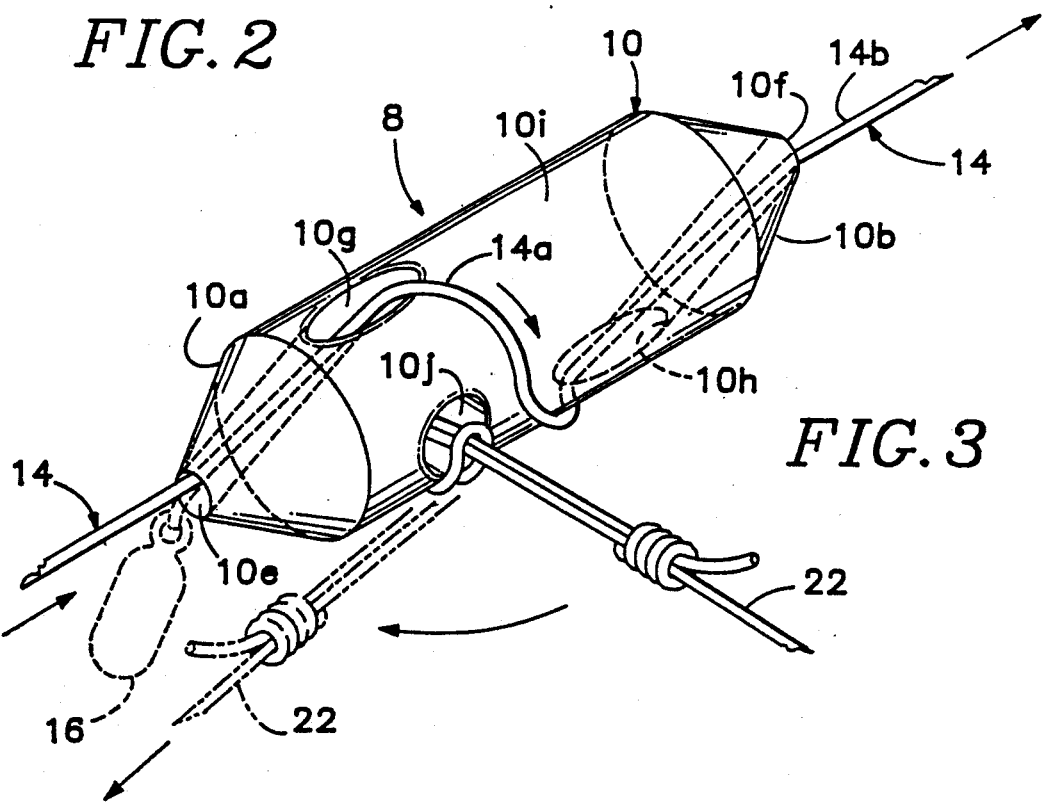
FIG. 3 is an isometric view of the embodiment of FIGS. 1 and 2.
Figure 6:
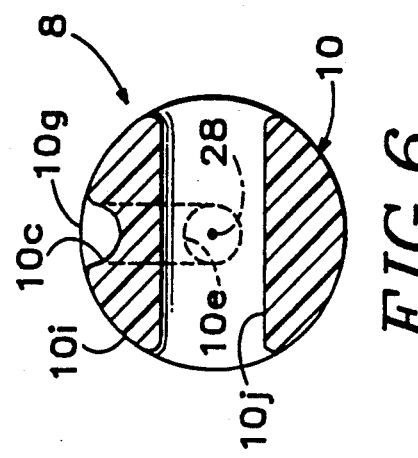
FIG. 6 is a cross section taken along line 6—6 in FIG. 4.
Figure 4:
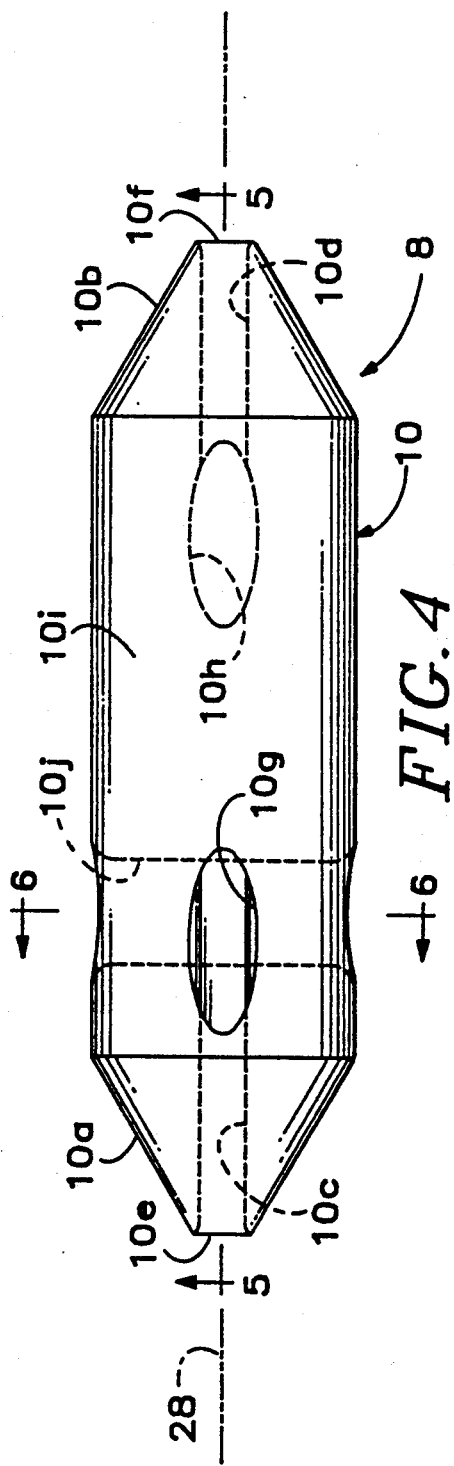
FIG. 4 is a top view of the embodiment shown in FIG. 3.
Figure 5:
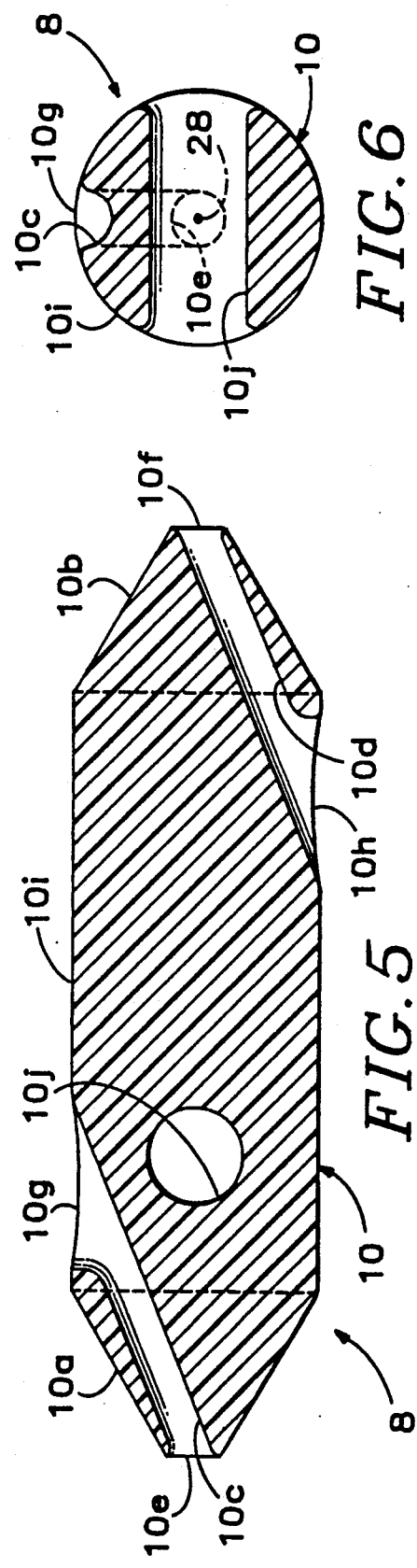
FIG. 5 is a cross section taken along line 5—5 in FIG. 4.

As shown in FIG. 3, main line 14 passes through bore 10d, around surface 10i and to sinker 16 through bore 10c, as shown. The wrapping of intermediate main line section 14a on the surface provides friction between the main line and rod 10. When there is no or little tension on the main line, device 10 may be easily slid along the main line in both directions.

Leader 22 is secured to device 8 by looping the loop end of the leader through channel 10j and passing the other end of the leader through the end of the loop, as shown. The fish bait 24 can thus be positioned anywhere along main line 14 prior to fishing. Then, when the bait and sinker are cast into the body of water, the sinker holds the line taught when pulled on by the angler. This is found to provide enough friction between the main line and device 8 to keep the device in position. If it is not, the friction can be increased by wrapping the main line around surface 10i 1½ times.

During fishing, leader 22 extends out from the side of device 8 as shown in solid lines in FIG. 3. When a fish is caught, the fish applies a greater force to the main line than does the sinker. This pulls the leader into alignment with the upper section 14b of main line extending between the device and pole. This configuration is shown with leader 22 in dashed lines.

With continued reeling in or pulling of line 14, device 8 is pulled down the main line until the sinker contacts the device, as shown by the dashed-line image of sinker 16. This is also the configuration illustrated in FIG. 2. By having channel 10j positioned closer to the distal end 10a, the pull by leader 22 on the device is generally in line with the direction of travel of line 14 through the bores. If the channel was near the other end, the pull of the leader would tend to twist the device relative to the main line, creating further resistance to movement of the device along the line. The angler can now play the fish with less chance of snags or fouled line otherwise due to the existence of a line and sinker.

It will be noted that bores 10c and 10d function primarily to capture the main line to hold it adjacent to surface 10i. The bores are sized to allow line to pass freely through it. Other designs could also be used. For instance, eyelets could be screwed into each end of the device body. Also, the bores could open to the same side of the device (allowing a complete wrap around the device) or to be closer so that the friction level can be adjusted by varying the length of wrap to fit the lines used and weights used.

Similarly, the importance of surface 10i is that the line wrap around it and stay in contact with it under tension, in order to create friction between the line and the surface, preferably without binding the line. Other surfaces could also be used. A groove or extended bore could be made in the body which controls the movement of line section 14a along the surface.

Also, the leader could be secured to the device in a variety of ways. The channel is a simple and inexpensive approach. Again, an eyelet screwed into the device body could also be used to attach the leader. Other devices are also usable.

Thus, while the invention has been described with reference to a preferred embodiment, it will be appreciated that changes and variations in the form and design may be made without varying from the spirit and scope of the invention as defined in the claims.

I claim:

1. A device for positioning an auxiliary element along a main line having a predetermined maximum diameter comprising;

first means defining a first opening sized for freely receiving the main line for restraining lateral movement of a first portion of the main line while allowing substantially free longitudinal movement of the main line, the first opening-defining means being a first bore extending through the body;

second means defining a second opening spaced from the first opening for freely receiving the main line for restraining lateral movement of a second portion of the main line while allowing substantially free longitudinal movement of the main line, the second opening-defining means being a second bore spaced from the first bore and extending through the body;

a body coupled to and positioned between the first and second opening-defining means and having opposite ends and a convex surface defining a curved path along which the main line extends when extending between the first and second openings, the surface being curved about a longitudinal axis extending through the first and second openings such that friction is created between the curved surface and the main line when the main line is on the curved path, and as greater tension is applied to the main line, greater force is required to move the main line over the curved surface; and means coupled to the body for securing the auxiliary element to the body for movement with the body when the body is moved relative to the main line whereby the body moves along the main line when sufficient force is applied to the securing means to overcome the friction between the main line and the curved surface;

the first and second bores extending from opposite respective ends of the body transversely through the body, relative to the longitudinal axis, to spaced locations on the curved surface, and the first and second openings being at respective opposite ends of the bores.

2. A device according to claim 1 wherein the first and second bores have respective third and fourth openings spaced along the longitudinal axis on the curved surface.

3. A device according to claim 2 wherein the first and second bores and the curved surface between the third and fourth openings define a path such that travel in one direction along the path results in travel in one direction along the longitudinal axis.

4. A device according to claim 1 wherein the first and second bores have respective third and fourth openings spaced circumferentially about the longitudinal axis on the curved surface.

5. A device for positioning an auxiliary element along a main line having a predetermined maximum diameter comprising:

first means defining a first opening sized for freely receiving the main line for restraining lateral movement of a first portion of the main line wile allowing substantially free longitudinal movement of the main line;

second means defining a second opening spaced from the first opening for freely receiving the main line for restraining lateral movement of a second portion of the main line while allowing substantially free longitudinal movement of the main line;

a body coupled to and positioned between the first and second opening-defining means and having opposite ends and a convex surface defining a curved path along which the main line extend when extending between the first and second openings, the surface being curved about a longitudinal axis extending through the first and second openings such that friction is created between the curved surface and the main line when the main line is on the curved path, and as greater tension is applied to the main line, greater force is required to move the main line over the curved surface, each of the first and second opening-defining means being adjacent to a respective one of the body ends; and means coupled to the body closer to one of the body ends than to the other end, for securing the auxiliary element to the body for movement with the body when the body is moved relative to the main line whereby the body moves along the main line when sufficient force is applied to the securing means to overcome the friction between the main line and the curved surface;

each of the first and second opening-defining means being adjacent to a respective one of the body ends.

6. A device for securing a bait line above a sinker attached to the end of a main line during fishing comprising:

a body having a cylindrical outer surface and opposite tapered ends;

a main line bore extending from each body end through the body and out through a bore side opening in the cylindrical outer surface opposite from the other bore side opening, each main line bore allowing substantially unrestrained passage of the main line, each bore side opening being closer to the body end through which the associated bore extends than to the other body end so that when the main line is placed through the bores so that it extends between the two bore side openings, it wraps around the cylindrical outer surface; and an auxiliary channel extending transversely through an intermediate portion of the body and having oppositely disposed channel side openings positioned closer to one body end than to the other body end.

7. A device according to claim 6 wherein the body ends taper from the outer cylindrical surface to adjacent to the bore end openings.

* * * * *